US012775131B2

(12) United States Patent
Manoharan et al.

(10) Patent No.: US 12,775,131 B2
(45) Date of Patent: Oct. 27, 2026

(54) STRUCTURAL COLORS WITH SHORT-WAVELENGTH RESPONSE FOR PACKAGING APPLICATIONS

(71) Applicant: President and Fellows of Harvard College, Cambridge, MA (US)

(72) Inventors: Vinothan N. Manoharan, Cambridge, MA (US); Anna B. Stephenson, Cambridge, MA (US); Victoria Hwang, Cambridge, MA (US); Ming Xiao, Cambridge, MA (US)

(73) Assignee: President and Fellows of Harvard College, Cambridge, MA (US)

(*) Notice: Subject to any disclaimer, the term of this patent is extended or adjusted under 35 U.S.C. 154(b) by 282 days.

(21) Appl. No.: 18/554,091

(22) PCT Filed: Apr. 5, 2022

(86) PCT No.: PCT/US2022/023399
§ 371 (c)(1),
(2) Date: Oct. 5, 2023

(87) PCT Pub. No.: WO2022/216652
PCT Pub. Date: Oct. 13, 2022

(65) Prior Publication Data
US 2024/0192416 A1 Jun. 13, 2024

Related U.S. Application Data

(60) Provisional application No. 63/171,345, filed on Apr. 6, 2021.

(51) Int. Cl.

| | |
|---|---|
| ***G02B 5/28*** | (2006.01) |
| ***C08J 7/04*** | (2020.01) |
| ***G02B 5/20*** | (2006.01) |

(52) U.S. Cl.
CPC .............. *G02B 5/286* (2013.01); *C08J 7/042* (2013.01); *G02B 5/206* (2013.01); *C08J 2367/03* (2013.01)

(58) Field of Classification Search
CPC .. G02B 5/284–288; G02B 5/26; G02B 5/286; G02B 5/206; B32B 27/08;
(Continued)

(56) References Cited

U.S. PATENT DOCUMENTS

| | | | | |
|---|---|---|---|---|
| 9,541,674 | B2 | 1/2017 | Manoharan et al. | |
| 2004/0012855 | A1 | 1/2004 | Allen et al. | |
| 2012/0301533 | A1* | 11/2012 | Uhlmann ............... | A01N 59/20 424/419 |
| 2014/0336295 | A1* | 11/2014 | Chi .................... | B01D 39/2079 521/149 |

(Continued)

FOREIGN PATENT DOCUMENTS

| | | |
|---|---|---|
| JP | 2016-114760 A | 6/2016 |

OTHER PUBLICATIONS

ASTM International, D20 Committee, "Standard Test Method for Haze and Luminous Transmittance of Transparent Plastics," Designation: D 1003-07, Nov. 2007. 7 pages. (https://doi.org/10.1520/D1003-07.).

(Continued)

*Primary Examiner* — Jonathan Y Jung
(74) *Attorney, Agent, or Firm* — Wilmer Cutler Pickering Hale and Dorr LLP

(57) ABSTRACT

A film including a polymer matrix with a first refractive index, a component with a second refractive index embedded in the polymer matrix in a disordered arrangement, wherein the second refractive index is different from the first refractive index, wherein the film scatters 400 to 500 nm wavelengths of light and allows transmission of wavelengths of light from 600 to 800 nm.

25 Claims, 13 Drawing Sheets

(58) Field of Classification Search
CPC ...... B32B 27/32-365; B32B 2307/416; B65D 65/20; C08J 7/042
See application file for complete search history.

(56) References Cited

U.S. PATENT DOCUMENTS

| | | | | |
|---|---|---|---|---|
| 2017/0307910 | A1 | 10/2017 | Nishio | |
| 2019/0033502 | A1 | 1/2019 | Du et al. | |
| 2019/0076809 | A1 | 3/2019 | Darji et al. | |
| 2019/0076810 | A1 | 3/2019 | Darji et al. | |
| 2019/0339522 | A1* | 11/2019 | Hsu | B32B 17/10623 |
| 2020/0308364 | A1* | 10/2020 | Veeraraghavan | C08J 9/32 |
| 2020/0341173 | A1 | 10/2020 | Schmidt et al. | |
| 2023/0086403 | A1* | 3/2023 | Shiraishi | C08L 75/04 428/325 |
| 2023/0116255 | A1* | 4/2023 | Numata | G02B 5/0242 359/359 |

OTHER PUBLICATIONS

Hwang et al., "Effects of Multiple Scattering on Angle-Independent Structural Color in Disordered Colloidal Materials," Phys. Rev. E, Jan. 30, 2020, vol. 101:012614. 13 pages.

International Search Report and Written Opinion mailed Jul. 29, 2022, in the International Application: PCT/US22/23399. 8 pages.

Magkiriadou et al., "Absence of Red Structural Color in Photonic Glasses, Bird Feathers, and Certain Beetles," Phys. Rev. E (2014), 90(6): 062302, arXiv pre-print: 1409.8575v2, Nov. 14, 2014. 9 pages.

Magkiriadou et al., "Disordered Packings of Core-Shell Particles with Angle-Independent Structural Colors," Optical Materials Express, Aug. 31, 2012, vol. 2(10), 1343-1352. 10 pages.

Markel, V. A., "Introduction to the Maxwell Garnett Approximation: Tutorial," J. Opt. Soc. Am. A, Josaa, Jun. 6, 2016, vol. 33(7), pp. 1244-1256.

Park et al., "Full-Spectrum Photonic Pigments with Non-Iridescent Structural Colors through Colloidal Assembly," Angewandte Chemie International Edition, Feb. 12, 2014, vol. 53(11), 2899-2903. 10 pages.

Vukusic et al., "Physical Methods for Investigating Structural Colours in Biological Systems," J. R. Soc. Interface, Jan. 21, 2009, vol. 6(Suppl 2), pp. S133-S148.

Xu, "Enhanced Outcoupling Efficiency and Removal of the Microcavity Effect in Top-Emitting OLED by Using a Simple Vapor Treated Corrugated Film," RSC Adv., Dec. 2017, vol. 7(86), pp. 54876-54880.

* cited by examiner

FIG. 12A
Mylar PET film
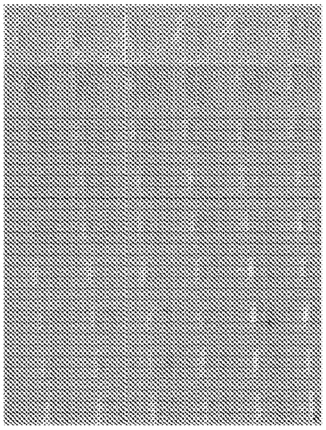
FIG. 12B
PP film from Noosa yogurt
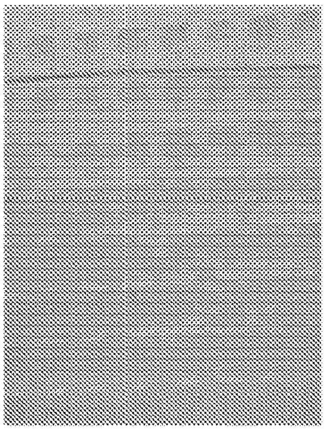
FIG. 12C
PS film from weighing boat
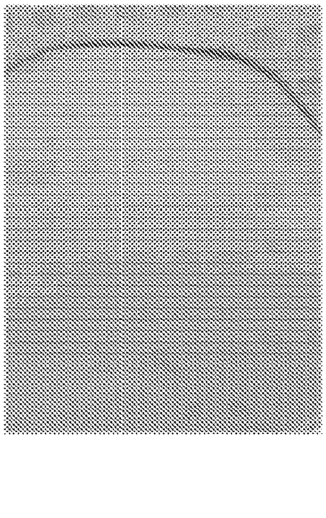
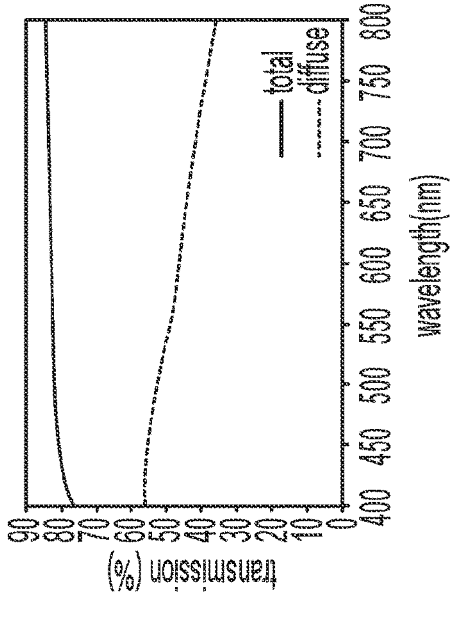
FIG. 12D
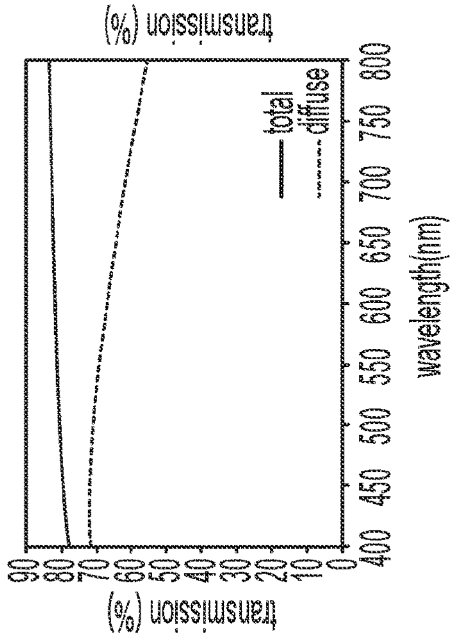
FIG. 12E
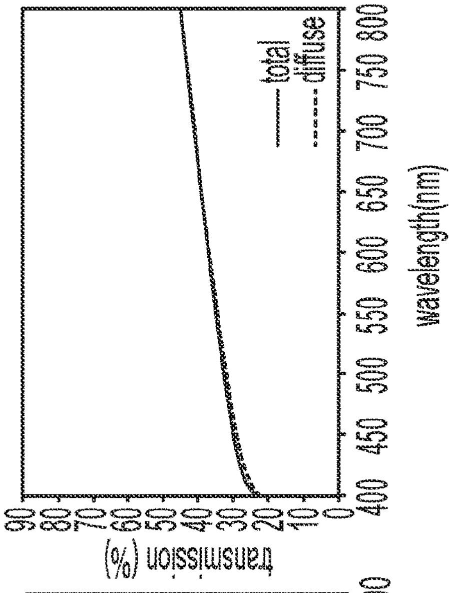
FIG. 12F

STRUCTURAL COLORS WITH SHORT-WAVELENGTH RESPONSE FOR PACKAGING APPLICATIONS

RELATED APPLICATIONS

This application is a U.S. National Stage application under 35 U.S.C. § 371 of International Patent Application No. PCT/US2022/023399, filed Apr. 5, 2022, which claims the benefit of priority to U.S. Provisional Application Ser. No. 63/171,345 filed Apr. 6, 2021, the contents of both of which are incorporated by in their entireties.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The instant application relates to food packaging. In particular, the instant application relates to food packaging with structural color.

BACKGROUND OF THE TECHNOLOGY

Food products are subject to light-induced damage. Packaging designs that use pigments to absorb harmful wavelengths add an undesired tint to the perceived color of the product. Opaque films that show broadband scattering block all light but prevent customers from seeing the product.

SUMMARY

In some aspects, a film includes a polymer matrix with a first refractive index, a component with a second refractive index embedded in the polymer matrix in a disordered arrangement, wherein the second refractive index is different from the first refractive index, wherein the film scatters 400 to 500 nm wavelengths of light and allows transmission of wavelengths of light from 600 to 800 nm.

In some embodiments, the reflectance from 400 to 500 nm at least 50%.

In some embodiments, the reflectance from 415 to 455 nm is at least 50%.

In some embodiments, the average reflectance above 500 nm is less than 70%.

In some embodiments, the haze of the film from 400 to 500 nm is at least 90%.

In some embodiments, the haze from 415-455 nm is at least 90%.

In some embodiments, the average haze above 500 nm is less than 80%.

In some embodiments, the polymer matrix is selected from a group consisting of polyethylene terephthalate, polypropylene, low density polyethylene, high density polyethylene, polycarbonate, polylactic acid, polycaprolactone, and combinations thereof.

In some embodiments, the film has a thickness of 0.39-39 mil.

In some embodiments, the polymer matrix is transparent to visible light.

In some embodiments, the polymer matrix has a refractive index of 1.4-1.7.

In some embodiments, the component has a shape selected from a group consisting of spherical, ellipsoidal, rod-like, tetrahedral, octahedral, or polyhedral.

In some embodiments, the component has a diameter of 130-250 nm.

In some embodiments, the film has a first peak of the structure factor with a height between 1 and 10.

In some embodiments, the component has a polydispersity less than 20%.

In some embodiments, the component had a volume fraction less than 0.64.

In some embodiments, the component has a volume fraction greater than 0.50.

In some embodiments, the component is a void.

In some embodiments, the component is a particle.

In some embodiments, the particle has a refractive index of 1.3-3.0.

In some embodiments, the particle is selected from a group consisting of anatase titania, rutile titania, zinc oxide, alumina, zirconia, silica, polymethylmethacrylate, polystyrene, polybutylmethacrylate, and combinations thereof.

In some embodiments, the second refractive index is greater than the first refractive index.

In some embodiments, the second refractive index is less than the first refractive index.

In some embodiments, the film further includes a second polymer layer disposed on one side of the polymer matrix.

In some embodiments, the second polymer layer is selected from a group consisting of polyethylene terephthalate, polypropylene, low density polyethylene, high density polyethylene, polycarbonate, polylactic acid, polycaprolactone, and combinations thereof.

Any aspect or embodiment disclosed herein may be combined with another aspect or embodiment disclosed herein. The combination of one or more embodiments described herein with other one or more embodiments described herein is expressly contemplated.

BRIEF DESCRIPTION OF THE DRAWINGS

The objects and advantages will be apparent upon consideration of the following detailed description, taken in conjunction with the accompanying drawings, in which like reference characters refer to like parts throughout, and in which:

FIG. 12A shows a photo of a mylar PET film over a textured background, according to some embodiments.

FIG. 12B shows a photo of a PP film over a textured background, according to some embodiments.

FIG. 12C shows a photo of a PS film from a PS film over a textured background, according to some embodiments.

FIG. 12D shows the measured total and diffuse transmission of a mylar PET film, according to some embodiments.

FIG. 12E shows the measured total and diffuse transmission of a PP film, according to some embodiments.

FIG. 12F shows the measured total and diffuse transmission of a PS film, according to some embodiments.

DETAILED DESCRIPTION

Figure 1:
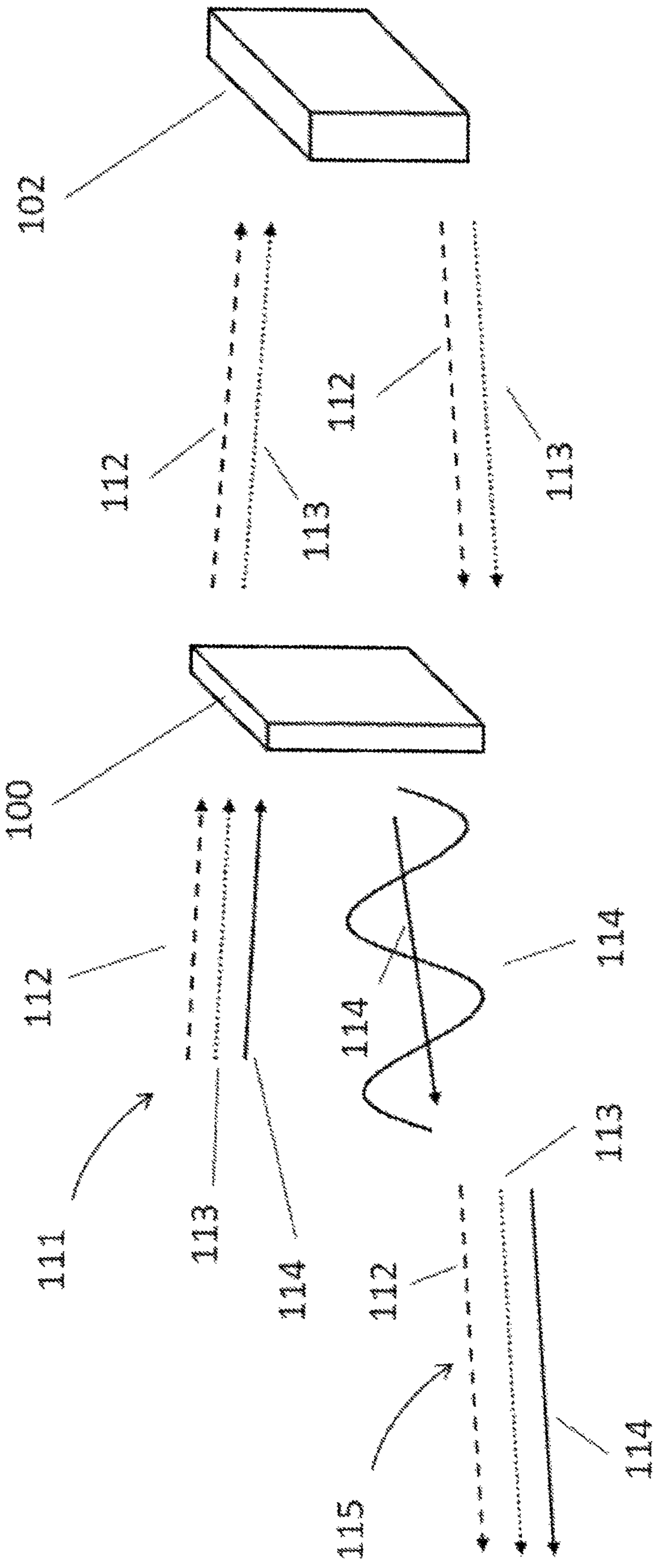
FIG. 1 shows a schematic of a packaging material that selectively scatters short wavelengths of light, preventing them from reaching a packaged food product, while transmitting long wavelengths of light, according to some embodiments.

In one aspect, a type of polymer packaging film is described that comprises a component embedded in a polymer matrix in a disordered arrangement. As shown in FIG. 1, when ambient light 111 is directed toward a packaged food product 102, the film 100 selectively reflects light that is harmful to the food products 102 (e.g., short wavelengths 114 between 415 and 455 nm or between 400 and 500 nm) while maintaining some transparency at other wavelengths (long wavelengths, e.g., red 112 and green 113 wavelengths), thereby enabling customers to see the product under the film. The short wavelengths 114 are scattered by the film 100, while the long wavelengths 112, 113 are transmitted through the film 100. The long wavelengths 112, 113 are then scattered by the product 102 and transmitted back through the film 100. As a result, the scattered light 115 has no apparent change in color. A physical understanding of the scattering effects in this film was used to design optimal system specifications.

Disordered suspensions of colloidal particles 100-300 nm in diameter can produce angle-independent structural colors at visible wavelengths. Without wishing to be bound by theory, a single-scattering model can explain the origin of color and why color does not depend on the viewing angle. The model can predict two major peaks in the reflection spectrum, which governs the color: (1) a peak from the structure factor, which arises from constructive interference between waves scattered by neighboring particles, and (2) a peak from the form factor, which arises from backscattering resonances within individual particles. These peaks are insensitive to the angle between the light source, sample, and viewer because both the structure and form factor depend only weakly on angle for a disordered suspension of particles. The peaks predicted by the model are in good agreement with experiment, showing that the model captures the essential physics of angle-independent structural color at visible wavelengths.

Experimental measurements of reflectance spectra from disordered packings of colloidal particles show that multiple scattering dominates the reflection spectrum at short wavelengths (in the blue and violet) because particles tend to scatter more at these wavelengths. Monte Carlo simulations modeling light propagation through these samples quantitatively reproduce experimentally measured reflection spectra, including the excess short-wavelength scattering. The quantitative agreement between experiment and Monte Carlo simulation shows that the simulation can be used not only to predict the reflectance of samples, but also as a design tool to explore the large parameter space of possible structures and colors.

These results inform a strategy to make effective short-wavelength filtering materials from disordered colloidal suspensions. In some embodiments, the film comprises a primary component 130-250 nm in diameter, such that the reflectance peak (due to the structure factor) is in the 400-500 nm range, while at the same time ensuring that the longer-wavelength scattering (due to the form factor) is small. In some embodiments, the film is an “direct structure,” comprising high-refractive-index particles inside a lower-refractive-index matrix. In some embodiments, the film is an “inverse structure,” comprising low-refractive-index particles or voids inside a higher-refractive-index matrix. The low refractive index of the particles ensures that the form-factor resonances are at short wavelengths and do not contribute significantly to scattering at wavelengths above 500 nm.

Figure 2A:
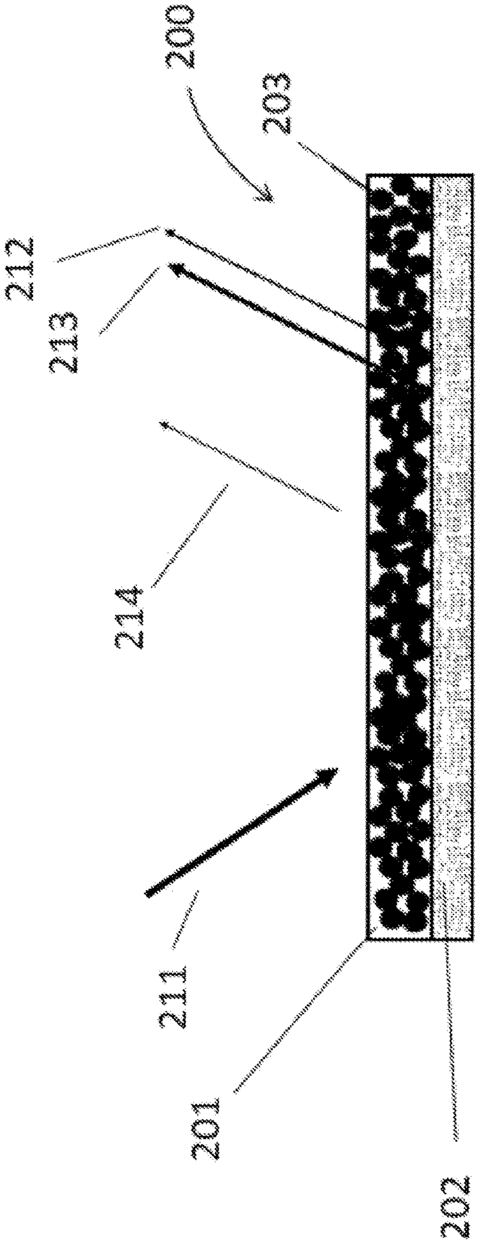
FIG. 2A shows a packaging film of colloidal particles embedded in a polymer film, according to some embodiments.
Figure 2B:
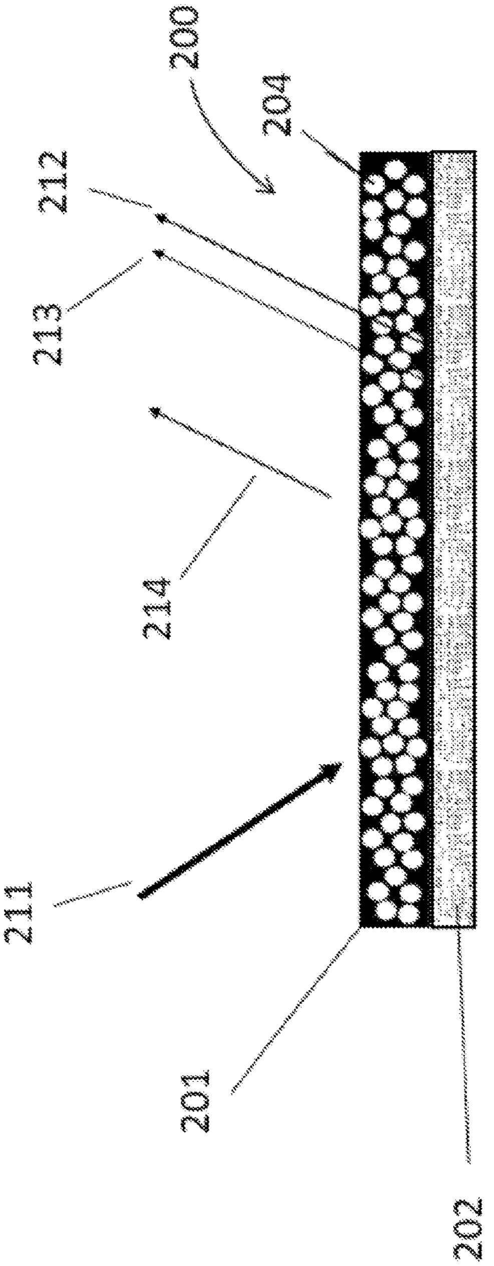
FIG. 2B shows a packaging film of voids embedded in a polymer film, according to some embodiments.

In some embodiments, shown in FIGS. 2A-2B, the films are formed by embedding pores or colloidal particles in a polymer film. FIG. 2A shows a direct-structure film 200 comprising a polymer film 201 with embedded particles 203 over a food product 202. FIG. 2B shows an inverse-structure film 200 comprising a polymer film 201 with embedded voids 204 over a food product 202. In the embodiments shown in FIGS. 2A-2B, when ambient light 211 is directed at the film 200 and food product 202, short-wavelength light 214 is scattered by the film 200, while longer-wavelength light 212, 213 is transmitted through the film 200 and reflected by the food product 202.

Optical Properties

In some embodiments, the films are optimized to preserve the color of the product while blocking short-wavelength light. The preservation of the color is characterized by the reflection spectrum with and without the packaging film. Preferably, the reflectance of such films should be high for the wavelength range to be blocked (e.g., 415-455 nm or 400-500 nm) and low at higher wavelengths, so that the film transmits as much of the light scattered from the product as possible. In some embodiments, the transition between high reflectance at low wavelengths and low reflectance at high wavelengths is steep. Preferably, the transmittance of such films should be low for the wavelength range to be blocked (e.g., 415-455 nm or 400-500 nm) and high at higher wavelengths, so that the film transmits as much of the light scattered from the product as possible.

In some embodiments, the films have a high reflectance and a low transmittance at wavelengths that are harmful to a food product. In some embodiments, food products contain compounds that undergo a chemical reaction, e.g., photo-oxidation, upon absorbing certain wavelengths of light. Non-limiting examples of such compounds include riboflavin, which absorbs wavelengths below 500 nm, and protophyrin IX, which absorbs wavelengths around 400-420 nm. In some embodiments, these compounds are found in dairy products. In some embodiments, absorption of light in these wavelengths cause deterioration or spoilage of the food product.

In some embodiments, harmful wavelengths include 400-500 nm. In some embodiments, harmful wavelengths include 415-455 nm. In some embodiments, harmful wavelengths include 400-410 nm, 410-420 nm, 420-430 nm, 430-440 nm, 440-450 nm, 450-460, 460-470, 470-480, 480-490, or 490-500. In some embodiments, the reflectance is inversely related to the time to deterioration of the food product. In some embodiments, a film with a lower reflectance will lead to a shorter time to deterioration. In some embodiments, the reflectance at these wavelengths is greater than 90%. In some embodiments, the reflectance at these wavelengths is greater than 80%. In some embodiments, the reflectance at these wavelengths is greater than 70%. In some embodiments, the reflectance at these wavelengths is greater than 60%. In some embodiments, the reflectance at these wavelengths is greater than 50%. In some embodiments, the transmittance at these wavelengths is less than 10%. In some embodiments, the transmittance at these wavelengths is less than 20%. In some embodiments, the transmittance at these wavelengths is less than 30%. In some embodiments, the transmittance at these wavelengths is less than 40%. In some embodiments, the transmittance at these wavelengths is less than 50%.

In some embodiments, the films have a high haze at wavelengths that are harmful to the product. In some embodiments, the haze at these wavelengths is greater than 90%.

In some embodiments, the films have a low reflectance and high transmittance at higher wavelengths which are not harmful to the product. In some embodiments, the higher wavelengths are greater than 455 nm. In some embodiments, the higher wavelengths are greater than 500 nm. In some embodiments, the higher wavelengths are greater than 550 nm. In some embodiments, the higher wavelengths are greater than 600 nm. In some embodiments, the reflectance at higher wavelengths is less than 5%. In some embodiments, the reflectance at higher wavelengths is less than 10%. In some embodiments, the reflectance at higher wavelengths is less than 20%. In some embodiments, the reflectance at higher wavelengths is less than 30%. In some embodiments, the reflectance at higher wavelengths is less than 40%. In some embodiments, the reflectance at higher wavelengths is less than 50%. In some embodiments, the reflectance at higher wavelengths is less than 60%. In some embodiments, the reflectance at higher wavelengths is less than 70%. In some embodiments, the transmittance at higher wavelengths is greater than 95%. In some embodiments, the transmittance at higher wavelengths is greater than 90%. In some embodiments, the transmittance at higher wavelengths is greater than 80%. In some embodiments, the transmittance at higher wavelengths is greater than 70%. In some embodiments, the transmittance at higher wavelengths is greater than 60%. In some embodiments, the transmittance at higher wavelengths is greater than 50%. In some embodiments, the transmittance at higher wavelengths is greater than 40%. In some embodiments, the transmittance at higher wavelengths is greater than 30%.

In some embodiments, the films have a low haze at higher wavelengths. In some embodiments, the haze at higher wavelengths is less than 20%. In some embodiments, the haze at higher wavelengths is less than 30%. In some embodiments, the haze at higher wavelengths is less than 40%. In some embodiments, the haze at higher wavelengths is less than 50%. In some embodiments, the haze at higher wavelengths is less than 60%. In some embodiments, the haze at higher wavelengths is less than 70%. In some embodiments, the haze at higher wavelengths is less than 80%.

Polymer Film

In some embodiments, the film comprises a polymer matrix. In some embodiments, the polymer matrix is a polymer used in food packaging. In some embodiments, the polymer matrix is a food-safe polymer. Non-limiting examples of polymers include polyethylene terephthalate (PET), polypropylene (PP), low density polyethylene (LDPE), high density polyethylene (HDPE), polycarbonate (PC), polylactic acid (PLA), polycaprolactone (PCL), and combinations thereof.

In some embodiments, the polymer matrix is transparent to visible light. In some embodiments, the transmittance of the polymer matrix at 380-800 nm is greater than 70%. In some embodiments, the transmittance of the polymer matrix at 380-800 nm is greater than 80%. In some embodiments, the transmittance of the polymer matrix at 380-800 nm is greater than 90%.

In some embodiments, the polymer film has a low refractive index. In some embodiments, the polymer film has a refractive index between 1.4 and 1.7. In some embodiments, the polymer film has a refractive index between 1.4 and 1.45. In some embodiments, the polymer film has a refractive index between 1.45 and 1.5. In some embodiments, the polymer film has a refractive index between 1.5 and 1.55. In some embodiments, the polymer film has a refractive index between 1.55 and 1.6. In some embodiments, the polymer film has a refractive index between 1.6 and 1.65. In some embodiments, the polymer film has a refractive index between 1.65 and 1.7.

In some embodiments, the polymer matrix has a thickness of 2.5-18 mil, where 1 mil is 1 thousandth of an inch. In some embodiments, the polymer matrix had a thickness of 0.39-39 mil. In some embodiments, the polymer matrix has a thickness of 5-10 mil. In some embodiments, the polymer matrix has a thickness of 10-15 mil. In some embodiments, increasing the thickness of the polymer matrix leads to stronger multiple scattering, which in turn leads to larger reflectance and haze at all wavelengths, and lower transmittance at all wavelengths.

Particles Embedded in Polymer Films

In some embodiments, shown in FIG. 2A, colloidal particles 203 are embedded in a polymer matrix 201. The parameters of these films 200 are optimized to scatter short-wavelength light 214 and transmit the longer wavelengths 212, 213. For a white product 202, longer wavelengths transmit through the packaging film, scatter from the product, and transmit once more through the packaging film to reach an observer. Preferably, the observer should therefore see a mixture of all wavelengths of light, creating a white color, and also still see the texture of the product beneath the film, since the longer wavelengths that are scattered from the product do not scatter again significantly when they pass through the film after scattering from the product.

In some embodiments, the particles have a disordered arrangement. In some embodiments, the particles have short-range correlation, but long-range disorder. In some embodiments, a disordered arrangement contributes to angularly independent optical properties. In some embodiments, particles are packed in a liquid-like arrangement. In some embodiments, the particles have a structure similar to liquid or glass. In some embodiments, the structure factor characterizes the disorder in the system. The higher the first peak of the structure factor, the higher the degree of short-range correlations in the system. In some embodiments, the height of the first peak depends on the volume fraction and polydispersity of the particles. In some embodiments, the height of the first peak ranges between 1 and 10.

In some embodiments, the particles have a diameter of 130-250 nm. In some embodiments, the particles have a diameter of 130-140 nm, 140-150 nm, 150-160 nm, 160-170 nm, 170-180 nm, 180-190 nm, 190-200 nm, 200-210 nm, 210-220 nm, 220-230 nm, 230-240 nm, 240-250 nm. In some embodiments, the sizes of the particles are on the order of the reflected wavelengths, and arrangements of particles with these sizes can lead to constructive interference and high scattering of light at such wavelengths. In some embodiments, the film is embedded with particles with two or more different diameters. In some embodiments, particles with different sizes have a broader reflectance peak such that the reflectance and haze have a more gradual decay.

In some embodiments, the particles have a refractive index that is different from the refractive index of the polymer film. In some embodiments, the refractive index of the particles differs from the refractive index of the polymer film by at least 0.08.

In some embodiments, the particles have a refractive index greater than the refractive index of the polymer film and the film is a direct structure. In some embodiments, the refractive index of the particles in a direct structure is 2.0-3.0. In some embodiments, the refractive index of the particles in a direct structure is 2.0-2.1. In some embodiments, the refractive index of the particles in a direct structure is 2.1-2.2. In some embodiments, the refractive index of the particles in a direct structure is 2.2-2.3. In some embodiments, the refractive index of the particles in a direct structure is 2.3-2.4. In some embodiments, the refractive index of the particles in a direct structure is 2.4-2.5. In some embodiments, the refractive index of the particles in a direct structure is 2.5-2.6. In some embodiments, the refractive index of the particles in a direct structure is 2.6-2.7. In some embodiments, the refractive index of the particles in a direct structure is 2.7-2.8. In some embodiments, the refractive index of the particles in a direct structure is 2.8-2.9. In some embodiments, the refractive index of the particles in a direct structure is 2.9-3.0.

In some embodiments, the particles have a refractive index less than the refractive index of the polymer film and the film is an inverse structure. In some embodiments, when the particles have a lower refractive index than the polymer, there is less scattering at higher wavelengths and there is a smaller change in the appearance of the product. In some embodiments, the refractive index of the particles in an inverse structure is 1.0-1.6. In some embodiments, the refractive index of the particles in an inverse structure is 1.0-1.1. In some embodiments, the refractive index of the particles in an inverse structure is 1.1-1.2. In some embodiments, the refractive index of the particles in an inverse structure is 1.2-1.3. In some embodiments, the refractive index of the particles in an inverse structure is 1.3-1.4. In some embodiments, the refractive index of the particles in an inverse structure is 1.4-1.5. In some embodiments, the refractive index of the particles in an inverse structure is 1.5-1.6.

In some embodiments, the particles are monodisperse. In some embodiments, the particles are polydisperse. In some embodiments, polydispersity increases reflectance at all wavelengths. In some embodiments, at sufficiently low polydispersity, the film has a high reflectance at low wavelengths (e.g., 415-455 nm or 400-500 nm) and sufficiently low reflectance at high wavelengths. In some embodiments, polydispersity contributes to disorder of the particles. In some embodiments, the polydispersity is less than 20%. In some embodiments, the polydispersity is less than 10%. In some embodiments, the polydispersity is less than 5%.

In some embodiments, the particles are transparent to visible light. In some embodiments, the particles absorb, scatter, or reflect UV light.

In some embodiments, the particles are metal oxide particles. Non-limiting examples of metal oxide particles include titania, alumina, zinc oxide, zirconia, silica, and combinations thereof. Non-limiting examples of titania particles include rutile and anatase. In some embodiments, the metal oxide particles have a refractive index greater than the refractive index of the polymer film and form a direct film. In some embodiments, the metal oxide particles have a refractive index less than the refractive index of the polymer film and form an inverse film. One non-limiting example of an inverse film is a polymer film with embedded silica particles. Preferably, the metal oxide particles are selected to have a refractive index that is different from the refractive index of the polymer film. In some embodiments, the refractive index of the particles differs from the polymer film by at least 0.08. In some embodiments, metal oxide particles are embedded in PET, PP, LDPE, HDPE, PC, PLA, or PCL films.

In some embodiments, the particles are polymer particles. The particles can be any polymer that forms 100-300 nm particles. In some embodiments, the polymer particles are formed by emulsion polymerization. In some embodiments, emulsion-polymerized particles are spherical. Non-limiting examples of polymer particles include polymethylmethacrylate (PMMA), polystyrene (PS), polybutylmethacrylate and combinations thereof. In some embodiments, the polymer particles have a refractive index greater than the refractive index of the polymer film and form a direct film. In some embodiments, the polymer particles have a refractive index less than the refractive index of the polymer film and form an inverse film. Preferably, the polymer particles are selected to have a refractive index that is different from the refractive index of the polymer film. In some embodiments, the refractive index of the particles differs from the polymer film by at least 0.08. In some embodiments, PMMA particles are embedded in a PET film. In some embodiments, PS particles are embedded in a polymer film other than PET.

In some embodiments, the particles have a volume fraction of 0.3-0.64. In some embodiments, the volume fraction is 0.5-0.64. In some embodiments, the volume fraction is sufficiently low that the film maintains a disordered structure. In some embodiments, the volume fraction is 0.3-0.4, 0.4-0.5, 0.5-0.6, or 0.6-0.64.

In some embodiments, the particles are spherical. In some embodiments, the particles are sphere-like in shape. In some embodiments, the particles are anisotropic. In some embodiments, the particles are ellipsoids. In some embodiments, the particles are rods. In some embodiments, the particles are polyhedral. In some embodiments, the particles are tetrahedral. In some embodiments, the particles are octahedral.

In some embodiments the film is formed by suspending particles in a polymer precursor and polymerizing the precursor. In some embodiments, the film is formed by mixing particles into a polymer melt and solidifying the polymer. In some embodiments, the film is formed by packing the particles, backfilling with the polymer precursor, and polymerizing the precursor. In some embodiments, the film is formed by packing the particles, backfilling with a polymer melt, and solidifying the polymer. In some embodiments, the film is formed by microphase separation of block copolymers. In some embodiments, the film is formed by suspending emulsion droplets of one polymer precursor in a second polymer precursor and polymerizing both the droplets and the precursor. In some embodiments, the film is formed by suspending emulsion droplets of a metal oxide precursor in a polymer precursor, converting the metal oxide precursor to oxide, and polymerizing the polymer precursor.

Voids Embedded in Polymer Films

In some embodiments, shown in FIG. 2B, to decrease the reflectance at longer wavelengths, voids 204 are embedded in a polymer matrix 201 to form an inverse structure 200. In some embodiments, an inverse structure has lower scattering at longer wavelengths 212, 213 because the voids have a smaller scattering cross-section and will therefore scatter less outside of the resonance peak of the structure factor at low wavelengths 214.

In some embodiments, the voids have a disordered arrangement. In some embodiments, the voids have short-range correlation, but long-range disorder. In some embodiments, a disordered arrangement contributes to angular independent optical properties. In some embodiments, voids are packed in a liquid-like arrangement. In some embodiments, the voids have a structure similar to liquid or glass. In some embodiments, the structure factor characterizes the disorder in the system. The higher the first peak of the structure factor, the higher the degree of short-range correlations in the system. In some embodiments, the height of the first peak depends on the volume fraction and polydispersity of the particles. In some embodiments, the height of the first peak of the structure can range between 1 and 10.

In some embodiments, the voids have a diameter of 130-250 nm. In some embodiments, the voids have a diameter of 130-140 nm, 140-150 nm, 150-160 nm, 160-170 nm, 170-180 nm, 180-190 nm, 190-200 nm, 200-210 nm, 210-220 nm, 220-230 nm, 230-240 nm, 240-250 nm. In some embodiments, the sizes of the voids are on the order of the reflected wavelengths, and arrangements of voids with these sizes can lead to constructive interference and high scattering of light at such wavelengths.

Figure 3A:
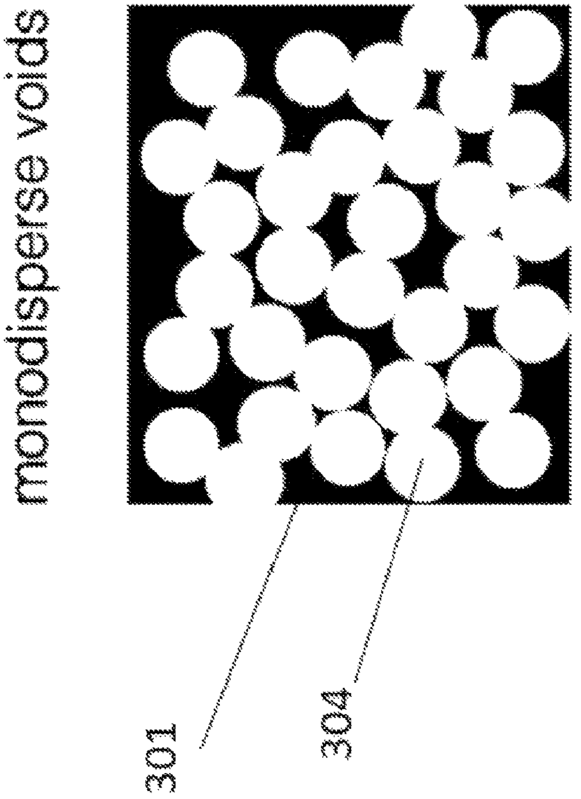
FIG. 3A shows a film with monodisperse voids, according to some embodiments.

In some embodiments, shown in FIG. 3A, the voids 304 embedded in the polymer matrix 301 are monodisperse. In some embodiments, it is challenging to fabricate monodisperse voids. In some embodiments, shown in FIG. 3B, the voids 304 embedded in the polymer matrix 301 are polydisperse. In some embodiments, polydispersity increases reflectance at all wavelengths. In some embodiments, at sufficiently low polydispersity, the film has a high reflectance at low wavelengths (e.g., 415-455 nm or 400-500 nm) and sufficiently low reflectance at high wavelengths. In some embodiments, polydispersity contributes to disorder of the particles. In some embodiments, the polydispersity is less than 20%. In some embodiments, the polydispersity is less than 10%. In some embodiments, the polydispersity is less than 5%.

In some embodiments, the voids have a volume fraction of 0.3-0.65. In some embodiments, the volume fraction is 0.5-0.64. In some embodiments, the volume fraction is sufficiently low that the film maintains a disordered structure. In some embodiments, the volume fraction is 0.3-0.4, 0.4-0.5, 0.5-0.6, or 0.6-0.64.

In some embodiments, the voids are spherical. In some embodiments, the voids are sphere-like in shape. In some embodiments, the voids are anisotropic. In some embodiments, the particles are ellipsoids. In some embodiments, the particles are rods. In some embodiments, the particles are polyhedral. In some embodiments, the particles are tetrahedra. In some embodiments, the particles are octahedra.

In some embodiments, a film with embedded voids is formed using sacrificial particles in the polymer film. In some embodiments, the sacrificial particles are suspended in a polymer precursor which is then polymerized. In some embodiments, the sacrificial particles are suspended in a polymer melt which is then solidified. In some embodiments the sacrificial particles are packed into a template and backfilled with a polymer precursor which is then polymerized. In some embodiments the sacrificial particles are packed into a template and backfilled with a polymer melt which is then solidified. In some embodiments, a film with embedded voids is formed by creating emulsions and removing the internal phase of the emulsion.

Double Layer Films

Figure 4:
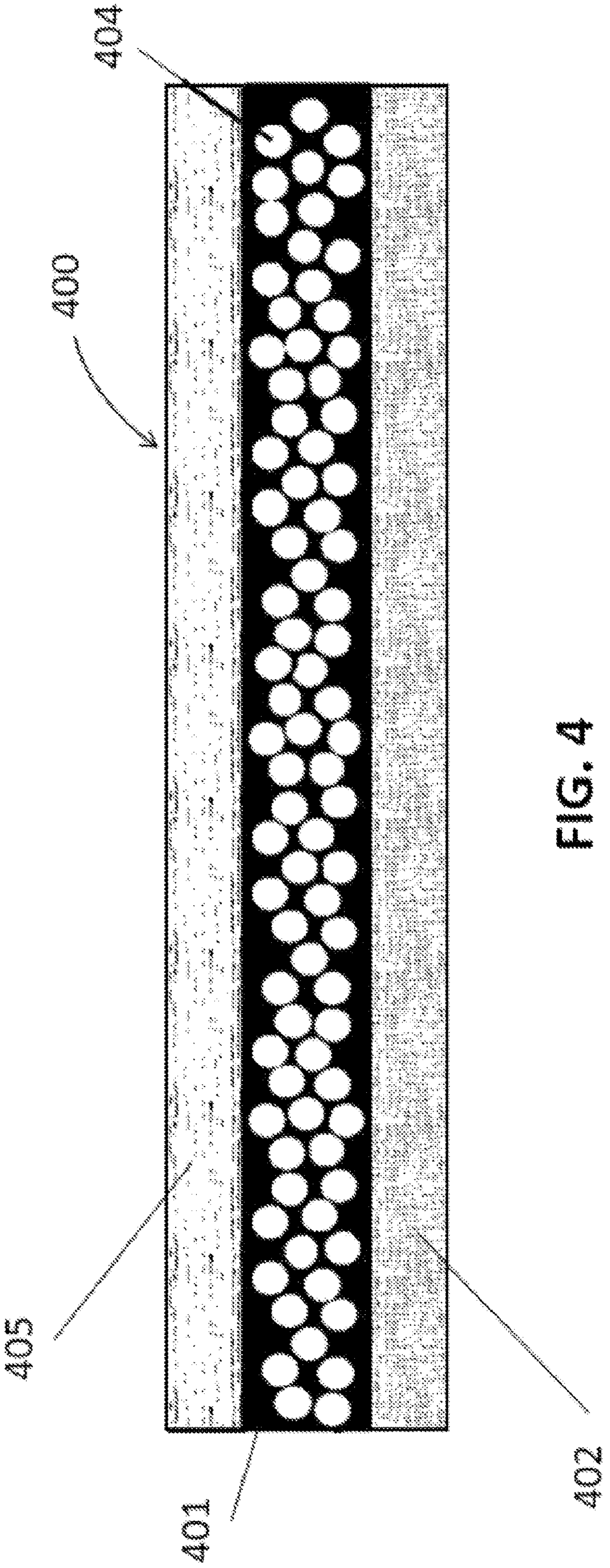
FIG. 4 shows a film with a first layer of a polymer matrix with embedded voids and a second layer of polymer, according to some embodiments.

In some embodiments, films with embedded particles or voids have increased permeability to air or water, which can damage a food product. In some embodiments, shown in FIG. 4, the film 400 comprises a second layer of polymer 405 disposed over the first layer of polymer 401 with embedded particles or voids 404. In this embodiment, the first layer of polymer 401 protects the food 402 from harmful wavelengths of light, while the second layer of polymer 405 protects the food 402 from air or water. In some embodiments, the second layer of polymer is optimized to reduce permeability. In some embodiments, the second layer of polymer does not impact the optical properties of the film.

In some embodiments, the second polymer is the same material as the first polymer. In some embodiments, the second polymer is different from the first polymer. Non-limiting examples of polymers for the second polymer layer include polyethylene terephthalate (PET), polypropylene (PP), low density polyethylene (LDPE), high density polyethylene (HDPE), polycarbonate (PC), polylactic acid (PLA), polycaprolactone (PCL), and combinations thereof.

In some embodiments the second polymer layer has a thickness of 2.5-18 mil to provide a physical barrier between the product and the external environment.

EXAMPLES

Certain embodiments will now be described in the following non-limiting examples.

Monte Carlo Simulation

Figure 5A:
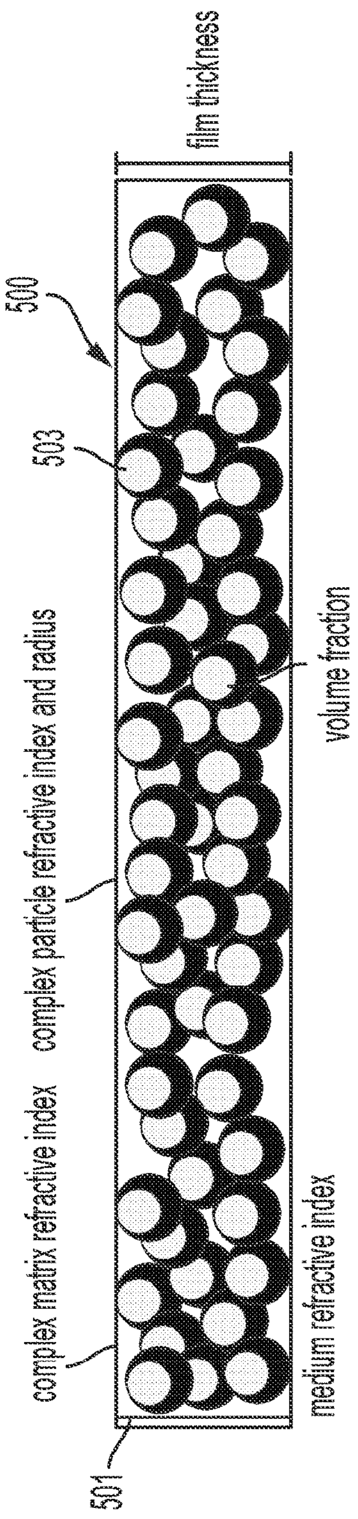
FIG. 5A shows a schematic of a film showing inputs for a model, according to some embodiments.

A multiple scattering model was used to study and optimize the optical properties of plastic films containing particles or voids. The model is based on Monte Carlo simulation of the trajectories of photons inside a structurally colored film. As shown in FIG. 5A, the system is assumed to be a film 500 containing a disordered packing of spherical scatterers 503 (which can be solid particles or air) in a matrix 501. The model takes as input parameters the complex refractive index and the radius of the spherical scatterers, the complex refractive index of the matrix, the volume fraction of the scatterers in the sample, and the thickness of the film. When the scatterers are polydisperse, a polydispersity index is input, and when the film is made of a mixture of two scatterers of different size, the mean radius of the second scatterer and its concentration is input. Finally, incident light is assumed to be collimated and normal to the sample in all calculations except for those used to characterize the bidirectional reflectance distribution function.

The photon packets have initial positions, directions, and weights. The positions are the (x, y, z)-coordinates in the sample's reference frame, and the packets start at z=0 and are randomly distributed along x and y. The directions are the directions of propagation after each scattering event and are initially in +z if the film surface is smooth. The weights account for absorption in the film, which comes from a non-zero imaginary refractive index of any of the film materials. As photon packets travel through the film, they are gradually absorbed according to the Beer-Lambert law, and their weights decrease accordingly. The initial normalized weight for all packets is 1.

Figure 5B:
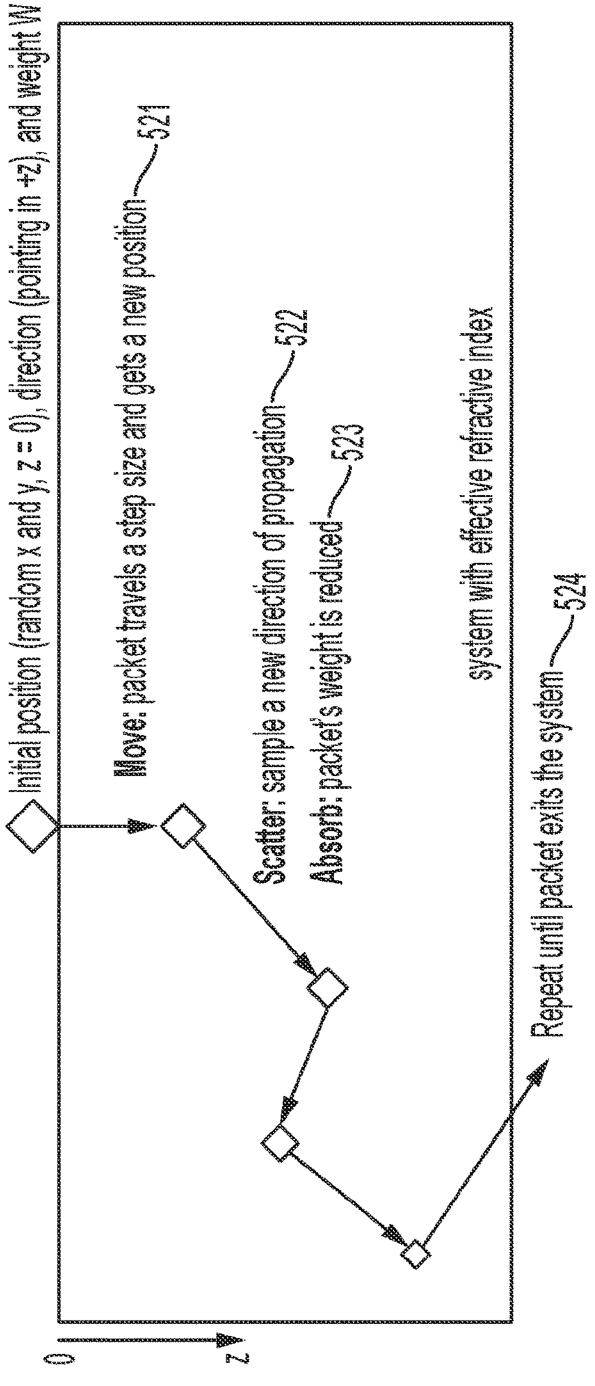
FIG. 5B shows a schematic of the steps of a Monte-Carol-based multiple scattering model, according to some embodiments.

FIG. 5B shows a diagram of the steps of the Monte-Carlo-based model. Initially, photon packets move into the system by taking a step 521. Then the photon packets scatter and adopt a new direction of propagation 522, which is randomly sampled from the phase function calculated from a single-scattering model as described below. At this point, the packet weights are updated if there is absorption in the system 523. The packets then take another step, and this process is repeated until the packet exits the film 524. After simulating the trajectories of thousands of packets, the reflection spectrum is predicted by counting how many packets are reflected, transmitted, or absorbed at different wavelengths.

The step sizes and the directions of propagation are randomly sampled from distributions, capturing the stochastic nature of multiple scattering. The step size distribution is based on Beer's law, and its mean is the scattering length:

$$p(\text{step}) = \frac{1}{l_{sca}} e^{-\frac{step}{l_{sca}}},\ l_{sca} = \frac{1}{\rho\ C_{sca}^{sample}} \tag{1}$$

where p(step) is the probability of a step size, $l_{sca}$ is the scattering length, ρ is the number density of scatterers, and $$C_{sca}^{sample}$$

is the scattering cross section of the sample calculated with an adapted version of the single scattering model that uses Bruggeman's approximation for the effective refractive index of the sample. The Bruggeman effective medium index is calculated from the following equations:

$$\sum\nolimits_{n=1}^{N} v_f \frac{\epsilon_n - \epsilon_{BG}}{\epsilon_n + 2\epsilon_{BG}} = 0, \text{ where } \sum\nolimits_{n=1}^{N} v_f = 1 \tag{2}$$

$$\sum\nolimits_{j=1}^{N} f_j \frac{n_j^2 - n_{BG}^2}{n_j^2 + 2n_{BG}^2} = 0, \text{ where } \sum\nolimits_{j=1}^{N} f_j = 1, \tag{3}$$

where Nis the number of components in the film, $f_j$ and $n_j$ are the volume fraction and complex index of component j, and $n_{BG}$ is the complex Bruggeman effective index of the sample.

Figure 6B:
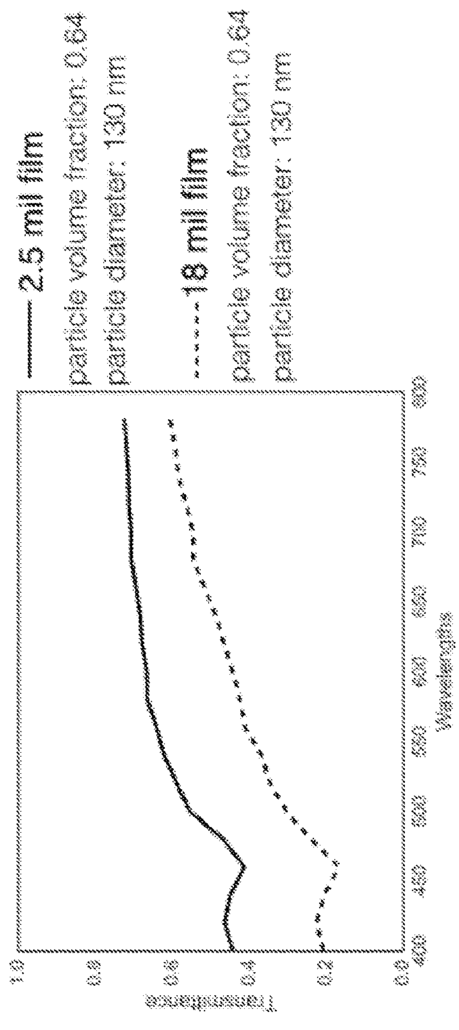
FIG. 6B shows the simulated transmittance spectra for a film of anatase particles embedded in a PET matrix optimized for high reflectance at 415-455 nm, according to some embodiments.
Figure 6A:
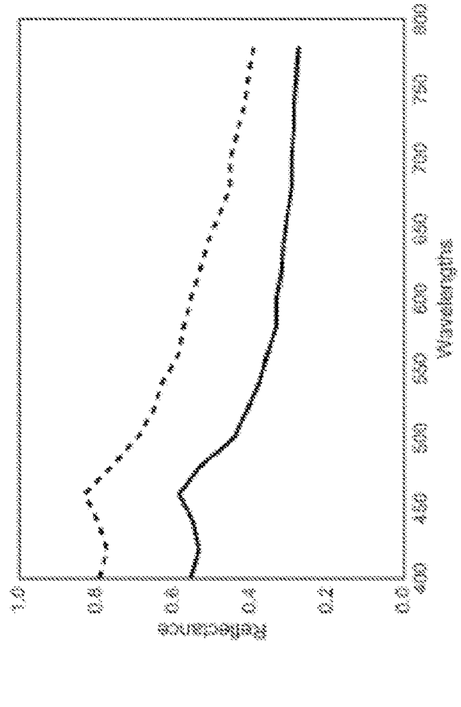
FIG. 6A shows the simulated reflectance spectra for a film of anatase particles embedded in a PET matrix optimized for high reflectance at 415-455 nm, according to some embodiments.
Figure 6D:
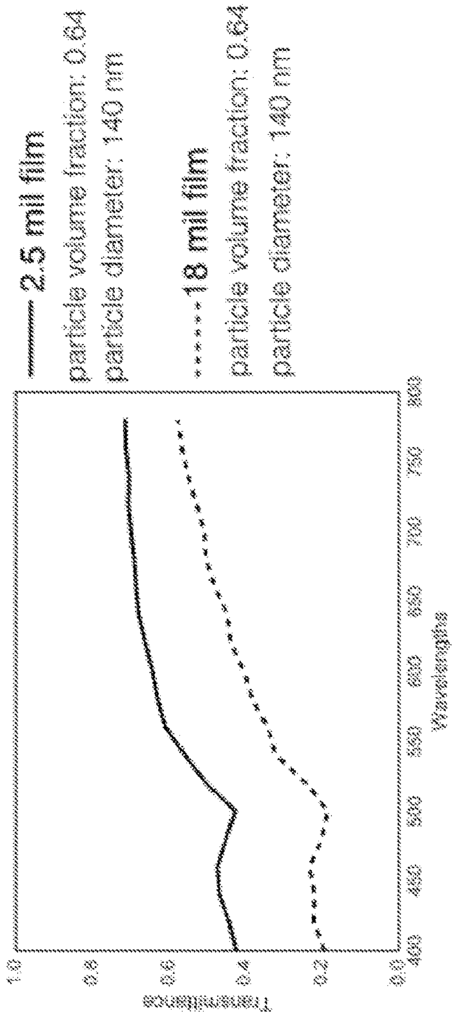
FIG. 6D shows the simulated transmittance spectra for a film of anatase particles embedded in a PET matrix optimized for high reflectance at 400-500 nm, according to some embodiments.
Figure 6C:
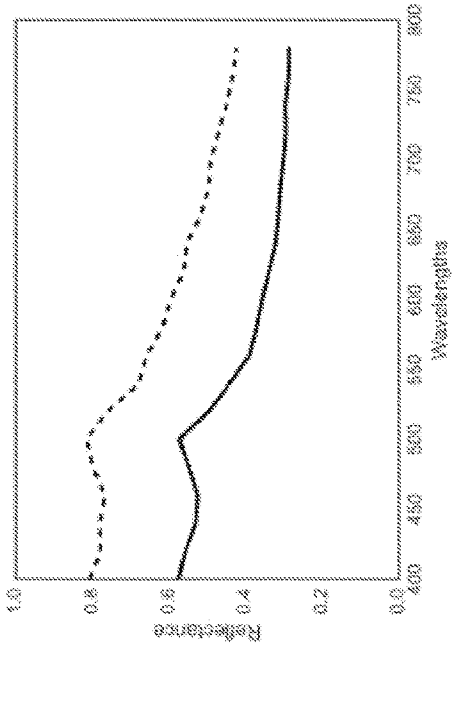
FIG. 6C shows the simulated reflectance spectra for a film of anatase particles embedded in a PET matrix optimized for high reflectance at 400-500 nm, according to some embodiments.

The distribution for the direction of propagation is the phase function, which describes the probability that light will be scattered in a certain direction:

$$p(\theta) = \frac{dC_{sca}^{sample}}{d\Omega} \frac{1}{C_{sca}^{sample}} \tag{4}$$

where p(θ) is the phase function at scattering angle θ and $$\frac{dC_{sca}^{sample}}{d\Omega}$$

is the differential scattering cross section of the film calculated with the single-scattering model Films with Particles Embedded in PET Films of anatase titania particles in a PET matrix were simulated. The film thicknesses was between 2.5 mil and 18 mil, where 1 mil is one thousandth of an inch, and particle size and volume fraction were optimized to obtain a high reflectance in the wavelength ranges of interest, 415-455 nm and 400-500 nm. FIGS. 6A-6B show the simulated reflectance and transmittance of films optimized to have a high reflectance at 415-455 nm. The 2.5 mil thick and 18 mil thick films both had an optimal particle diameter of 130 nm and an optimal particle volume fraction of 0.64. The reflectance is as high as 80% for wavelengths of 415-455 nm for the parameters chosen. FIGS. 6C-6D show the stimulated reflectance and transmittance of films optimized to have a high reflectance at 400-500 nm. The 2.5 mil thick and 18 mil thick films both had an optimal particle diameter of 140 nm and an optimal particle volume fraction of 0.64. The reflectance is as high as 80% for wavelengths of 400-500 nm for the parameters chosen. However, there is also some reflectance in the longer wavelengths (e.g., greater than 455 nm or greater than 500 nm) as well, which could distort the appearance of the products.

Films with Voids Embedded in PET

Figure 7A:
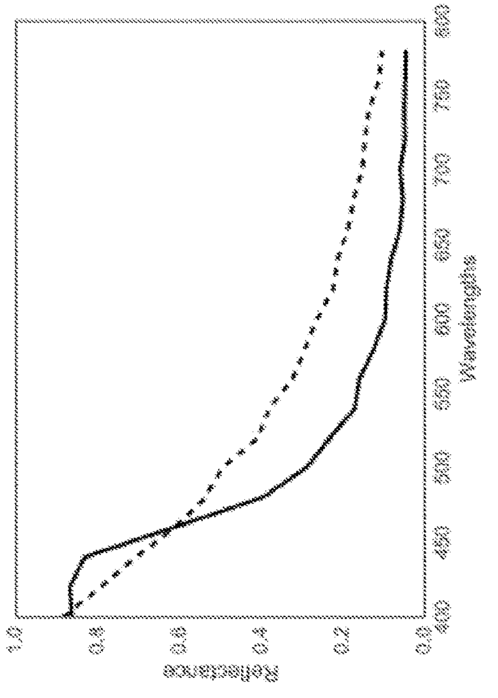
FIG. 7A shows the simulated reflectance spectra for a film of voids embedded in a PET matrix optimized for high reflectance at 415-455 nm, according to some embodiments.
Figure 7B:
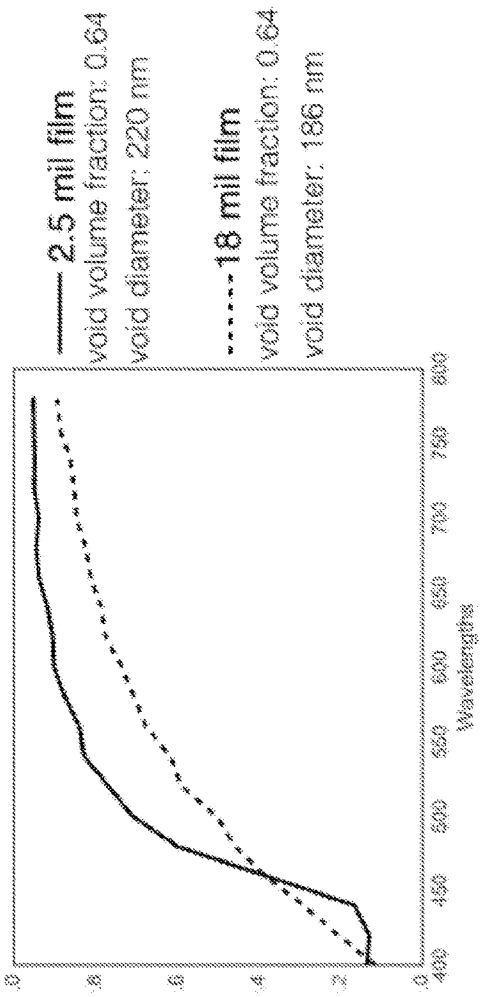
FIG. 7B shows the simulated transmittance spectra for a film of voids embedded in a PET matrix optimized for high reflectance at 415-455 nm, according to some embodiments.
Figure 7C:
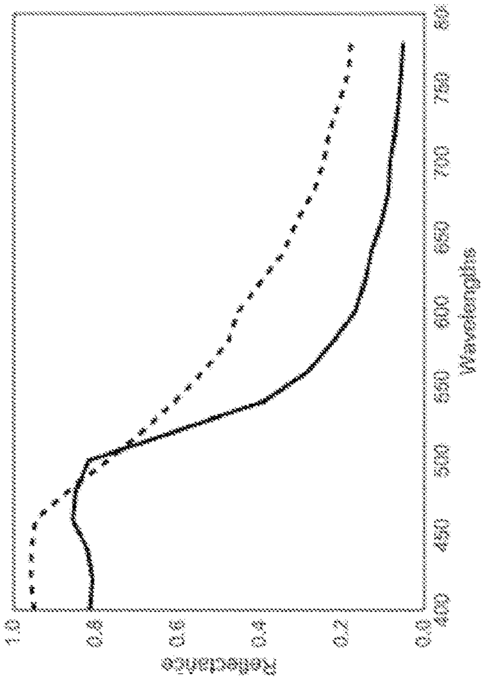
FIG. 7C shows the simulated reflectance spectra for a film of voids embedded in a PET matrix optimized for high reflectance at 400-500 nm, according to some embodiments.
Figure 7D:
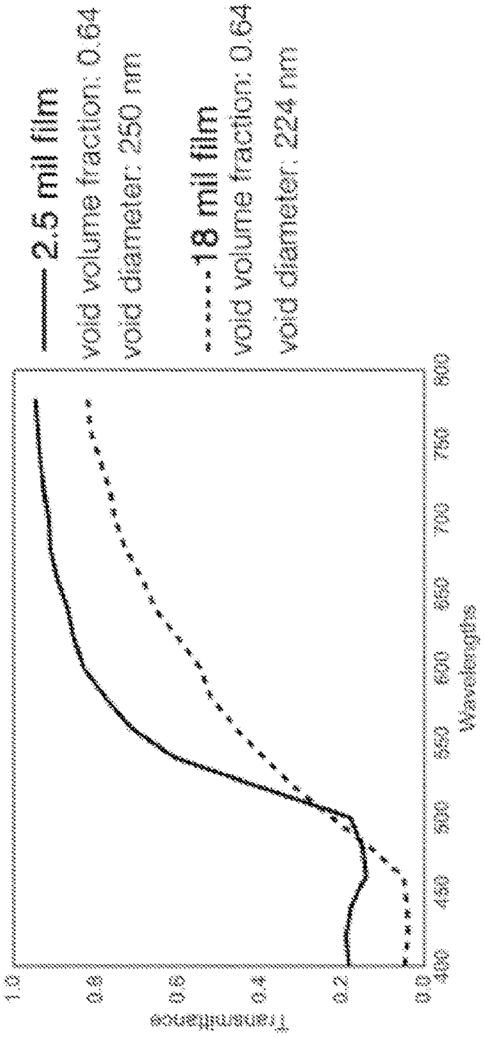
FIG. 7D shows the simulated transmittance spectra for a film of voids embedded in a PET matrix optimized for high reflectance at 400-500 nm, according to some embodiments.

Films of voids embedded in a PET matrix were simulated. The film thicknesses were between 2.5 mil and 18 mil, and particle size and volume fraction were optimized to obtain a high reflectance in the wavelength ranges of interest, 415-455 nm and 400-500 nm. FIGS. 7A-7B show the simulated reflectance and transmittance of films optimized to have a high reflectance at 415-455 nm. The 2.5 mil thick films had an optimal void diameter of 220 nm and an optimal void volume fraction of 0.64, while the 18 mil thick films had an optimal void diameter of 186 nm and an optimal void volume fraction of 0.64. FIGS. 7C-7D show the stimulated reflectance and transmittance of films optimized to have a high reflectance at 400-500 nm. The 2.5 mil thick films had an optimal void diameter of 250 nm and an optimal void volume fraction of 0.64, while the 18 mil thick films had an optimal void diameter of 224 nm and an optimal void volume fraction of 0.64. These inverse structures lead to a much sharper cutoff in reflectance, compared to direct structures with embedded particles shown in FIGS. 6A-6D. The short-wavelength reflectance (e.g., at 415-455 or 400-500) is slightly higher than that in the direct structures, and the longer-wavelength reflectance (e.g., greater than 455 or greater than 500) is much lower. Thus, these inverse structures let more long-wavelength light pass through the film and reflect from the product. Therefore, inverse structures will alter the appearance of the product less than direct structures will.

Polydispersity

Figure 3B:
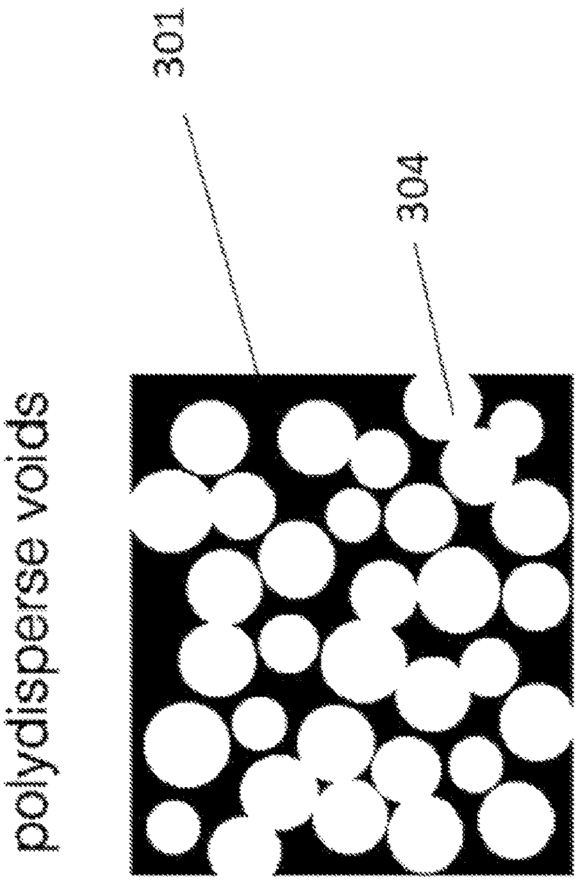
FIG. 3B shows a film with polydisperse voids, according to some embodiments.

The effect of polydispersity, or a distribution of sizes, as shown in FIG. 3B, on the reflectance and transmittance of inverse films was simulated. To quantify the polydispersity, the polydispersity index was used. The polydispersity index is defined as $\sigma/d_{avg}$, where σ is the standard deviation of the particle or void diameter and $d_{avg}$ is the average particle or void diameter. This value is multiplied by 100% to report the polydispersity as a percentage.

Figures 8A, 8B, 8C, 8D:
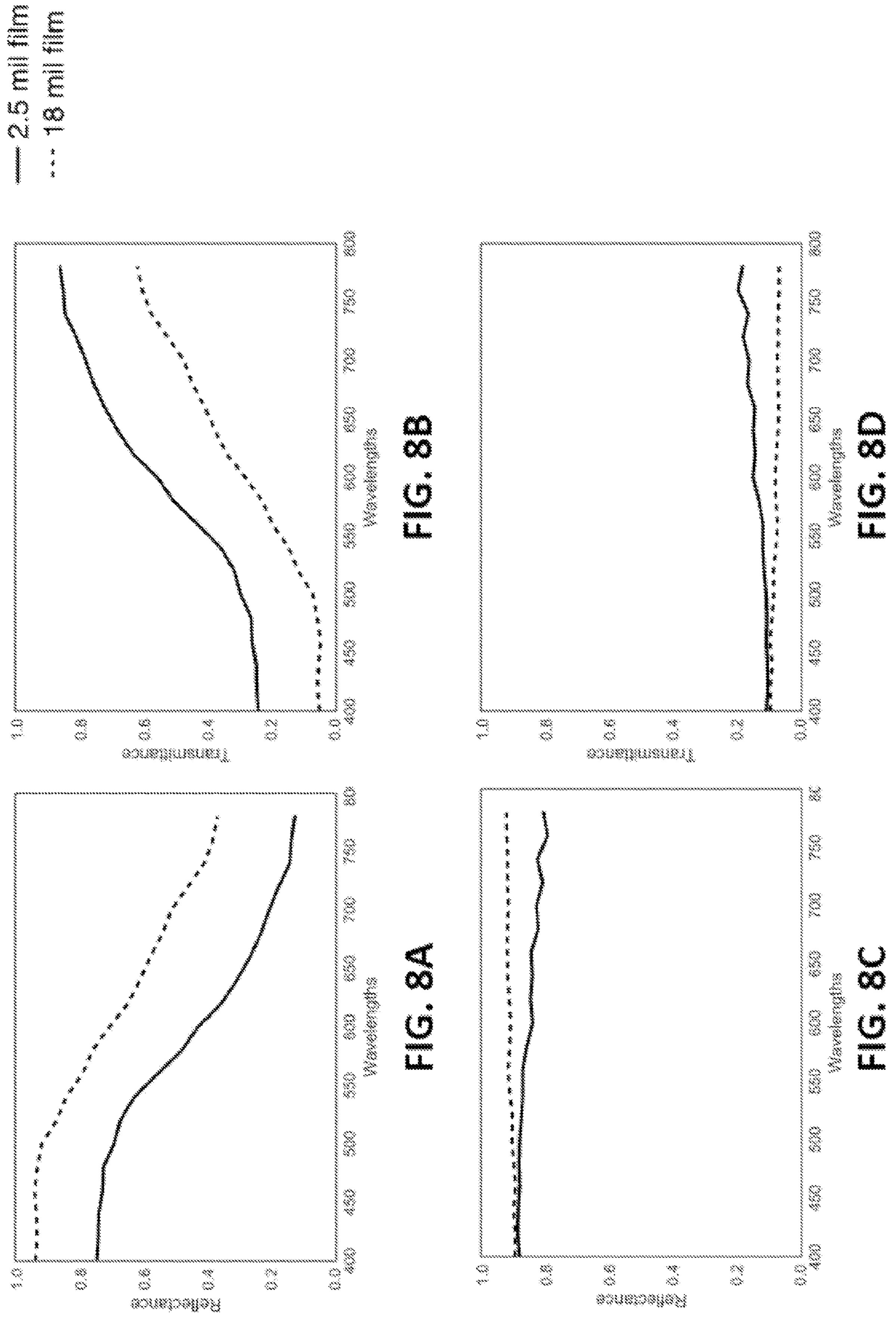
FIG. 8A shows the simulated reflectance spectra for a film of voids embedded in a PET matrix with 20% polydispersity, according to some embodiments.
FIG. 8B shows the simulated transmittance spectra for a film of voids embedded in a PET matrix with 20% polydispersity, according to some embodiments.
FIG. 8C shows the simulated reflectance spectra for a film of voids embedded in a PET matrix with 100% polydispersity, according to some embodiments.
FIG. 8D shows the simulated transmittance spectra for a film of voids embedded in a PET matrix with 100% polydispersity, according to some embodiments.

The reflectance and transmittance spectra were simulated for inverse films with polydispersities of 20% and 100% and optimized for high reflectance at 400-500 nm. 2.5 mil thick films were simulated with a void volume fraction of 0.64 and an average void diameter of 250 nm. 18 mil thick films were simulated with a void volume fraction of 0.64 and an average void diameter of 224 nm. As shown in FIGS. 8A-8B, for 20% polydispersity, the cutoff between high reflectance at short wavelength and low reflectance and long wavelength is more gradual than for films with monodisperse voids (shown in FIGS. 7C-7D). As shown in FIGS. 8C-8D, for the extreme case of 100% polydispesrsity, the reflectance is high at all wavelengths, meaning that the texture of the product would not be visible beneath the film. These results suggest that while polydispersity generally leads to higher reflectance at long wavelengths, a film with a significant drop in reflectance at long wavelengths can still be achieved up to at least 20% polydispersity. Therefore, inverse films, even those with some amount of polydispersity, can form packaging films to block short-wavelength light without obscuring the product.

Double-Layer Films

Figure 9A:
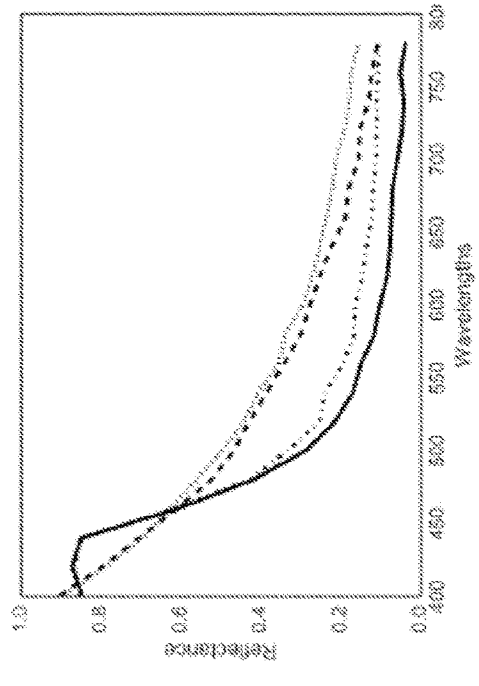
FIG. 9A shows the simulated reflectance spectra for single- and double-layer films of voids embedded in a PET matrix optimized for high reflection from 415-455 nm, according to some embodiments.
Figure 9B:
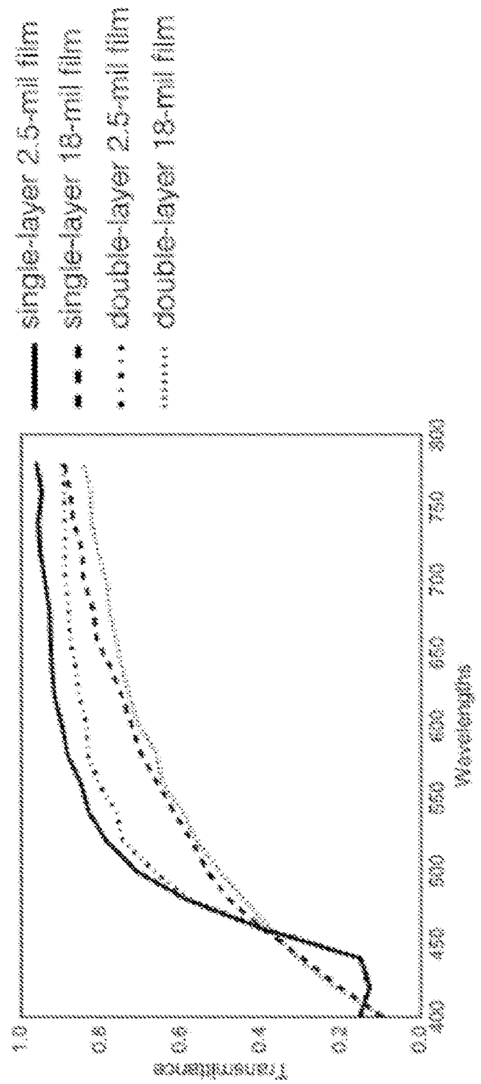
FIG. 9B shows the simulated transmittance spectra for single- and double-layer films of voids embedded in a PET matrix optimized for high reflection from 415-455 nm, according to some embodiments.
Figure 9C:
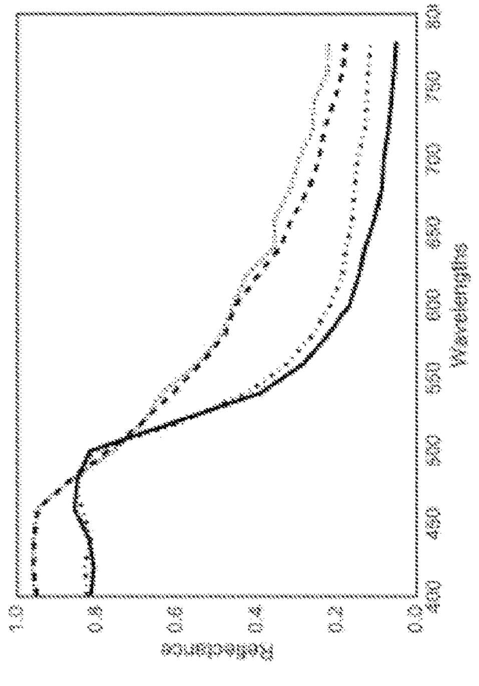
FIG. 9C shows the simulated reflectance spectra for single- and double-layer films of voids embedded in a PET matrix optimized for high reflection from 400-500 nm, according to some embodiments.
Figure 9D:
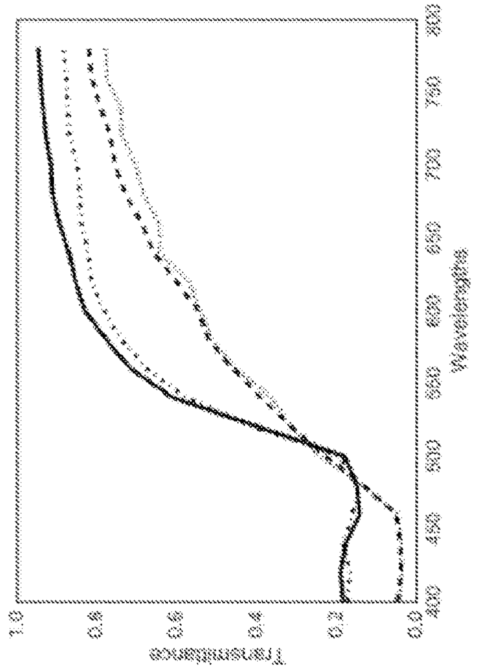
FIG. 9D shows the simulated transmittance spectra for single- and double-layer films of voids embedded in a PET matrix optimized for high reflection from 400-500 nm, according to some embodiments.

Double-layer films were simulated using the same parameters as in the inverse films simulated in FIGS. 7A-7D. Double layer films include a first layer of PET with embedded voids and a second layer of PET disposed over the first layer. In FIGS. 9A-9D, single-layer films are shown by a solid line and double-layer films are shown by a dotted line. FIGS. 9A-9B show the simulated reflectance and transmittance of films optimized to have a high reflectance at 415-455 nm. FIGS. 9C-9D show the simulated reflectance and transmittance of films optimized to have a high reflectance at 400-500 nm. The reflectance and transmittance spectra of the double-layer films are nearly identical to those of the single-layer films. This result shows that adding a second layer of polymer on top of the inverse film has a negligible effect on the optical properties of the film. Second layers of other transparent polymers would also have negligible effects. Thus, the material used for the second layer can be optimized to prevent diffusion, while the first layer can be optimized to block short wavelengths.

Haze Measurements

The haze is calculated to quantify clarity of films. Haze is the diffuse transmittance (transmitted light that is scattered more than 2.5° from the direction of the incident beam) divided by the total transmittance. A smaller haze means the sample is more transparent. The haze of inverse films was simulated and then, to provide a comparison, the haze of existing, non-porous packaging plastics was experimentally measured. The comparison can be used to qualitatively predict the effect the proposed porous films will have on the appearance of the product.

To calculate haze from Monte Carlo simulations, the diffuse transmittance was calculated by counting only those trajectories that are transmitted at angles more than 2.4° from the incident direction, and then the diffuse transmittance was divided by the total transmittance. The 2.4° cutoff angle is chosen to compare simulated haze with the haze measured experimentally.

Figures 10A, 10B, 10C:
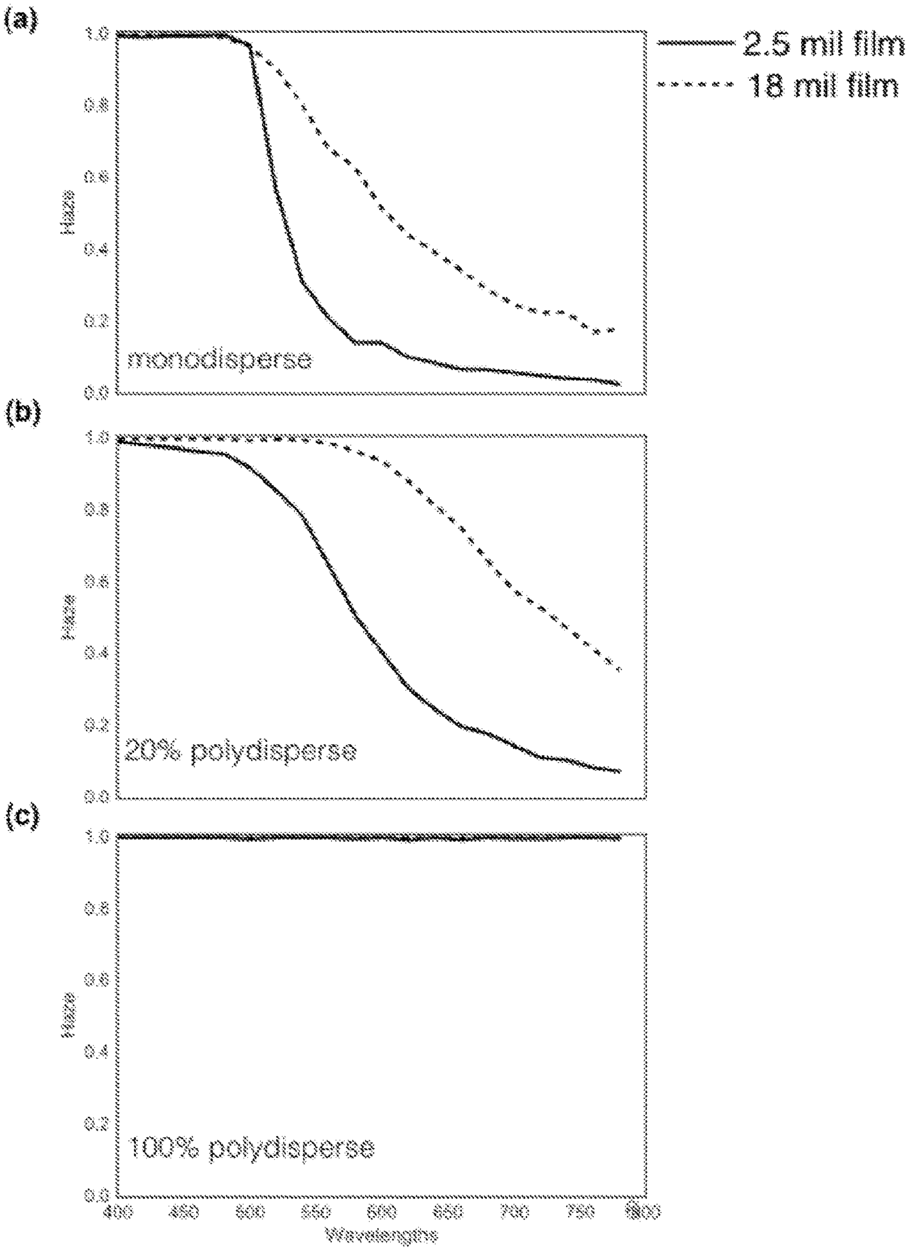
FIG. 10A shows the simulated haze spectra for monodisperse films of voids embedded in a PET matrix optimized for high reflection from 400-500 nm, according to some embodiments.
FIG. 10B shows the simulated haze spectra for films of voids with 20% polydispersity embedded in a PET matrix optimized for high reflection from 400-500 nm, according to some embodiments.
FIG. 10C shows the simulated haze spectra for films of voids with 100% polydispersity embedded in a PET matrix optimized for high reflection from 400-500 nm, according to some embodiments.

FIG. 10A shows that for monodisperse voids in inverse films, the haze is very high, close to 100%, from 400 to 500 nm, as expected and desired. The haze at longer wavelengths is much lower, suggesting that the film is nearly transparent at longer wavelengths. FIG. 10B shows that for inverse films with 20% polydispersity, the haze is also high at short wavelengths and low at long wavelengths, but the transition from high haze at low wavelengths to low haze at high wavelengths is more gradual than in the monodisperse case. FIG. 10C shows that for inverse films with 100% polydispersity, the haze is high at all wavelengths. These results show that inverse films with polydispersity of 20% or smaller are good candidates for packaging films, while films with polydispersity close to 100% distort the appearance of the product.

Figures 11A, 11B, 11C, 11D:
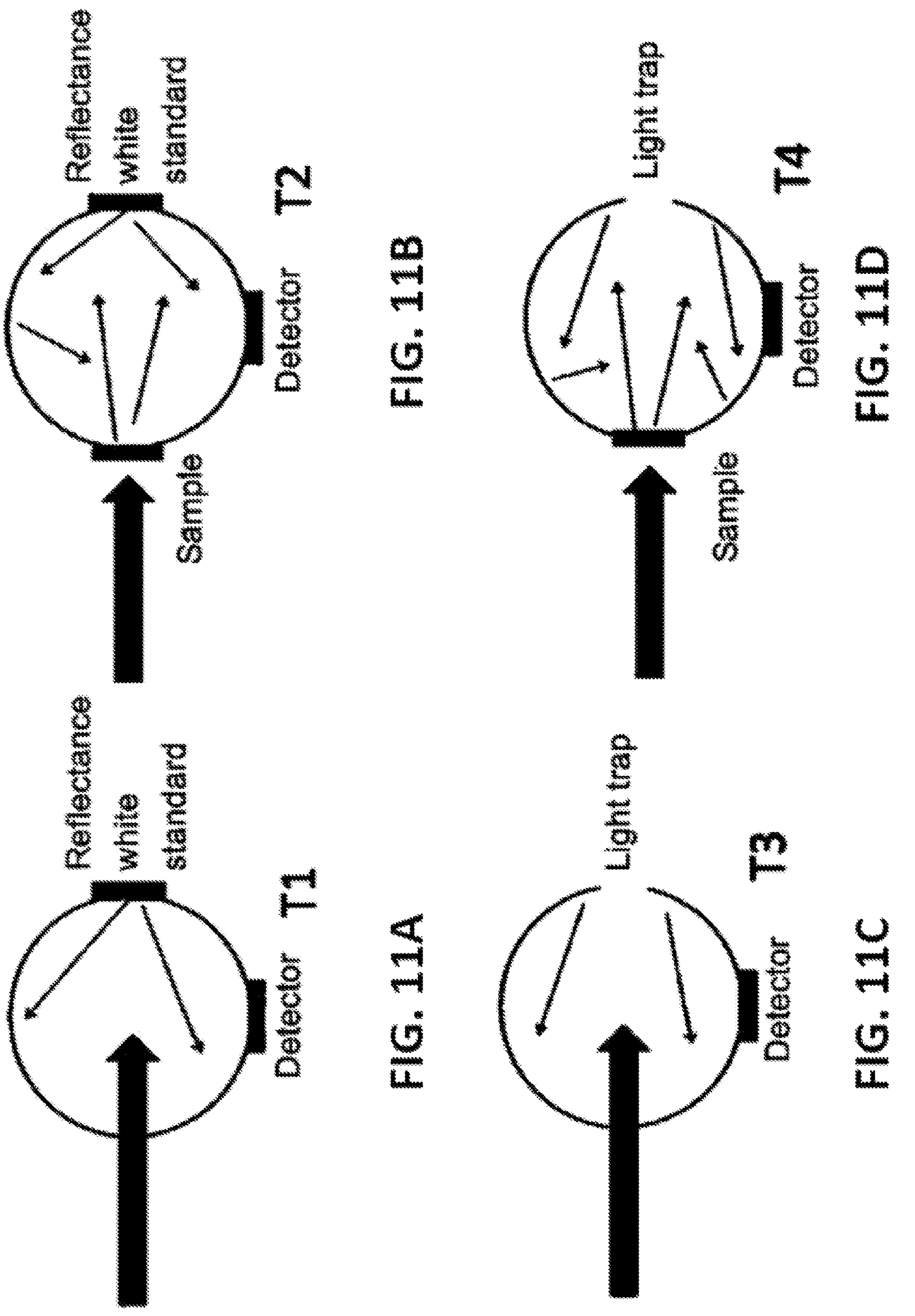
FIG. 11A shows a schematic of the setup to measure the total incident light ($T_1$) for a standard haze measurement, according to some embodiments.
FIG. 11B shows a schematic of the setup to measure the total light transmitted by a sample ($T_2$) for a standard haze measurement, according to some embodiments.
FIG. 11C shows a schematic of the setup to measure the light scattered by the instrument ($T_3$) for a standard haze measurement, according to some embodiments.
FIG. 11D shows a schematic of the setup to measure the normalized transmittance of the sample ($T_4$) for a standard haze measurement, according to some embodiments.

Haze was measured using ASTM standard D1003. The standard specifies four quantities, shown in FIGS. 11A-11D, that need to be measured: the total incident light ($T_1$, shown in FIG. 11A) in the absence of a sample or light trap, the total light transmitted by the sample ($T_2$, shown in FIG. 11B), the light scattered by the instrument ($T_3$, shown in FIG. 11C), and the light scattered by the instrument and the sample ($T_4$, shown in FIG. 11D). The normalized transmittance of the sample is $T_{total}=T_1/T_2$, and the diffuse light is $T_{diffuse}=[T_4-T_3(T_2/T_1)]T_1$. The haze is then $H=T_{diffuse}/T_{total}$. Haze was measured using a Cary 7000 integrating sphere (Agilent Technologies) with an inner diameter of 6 inches. The light trap diameter is 0.5 inches, making the minimum scattering angle for diffuse transmission 2.4°, which is very close to the standard 2.5°.

To provide comparison for the simulated haze values, the haze was measured for three plastic films without embedded voids or particles: a transparent mylar film (PET, 120 μm thick), a semitransparent film from a yogurt container (polypropylene (PP), 800 μm thick), and an opaque film cut from a plastic weighing boat (made from anti-static polystyrene (PS), 230 μm thick). As seen in FIGS. 12A-12C, it is possible to see a textured background through both the mylar PET film (FIG. 12A) and the PP film (FIG. 12B), while the textured background is not visible through the opaque PS film (FIG. 12C).

Figure 13:
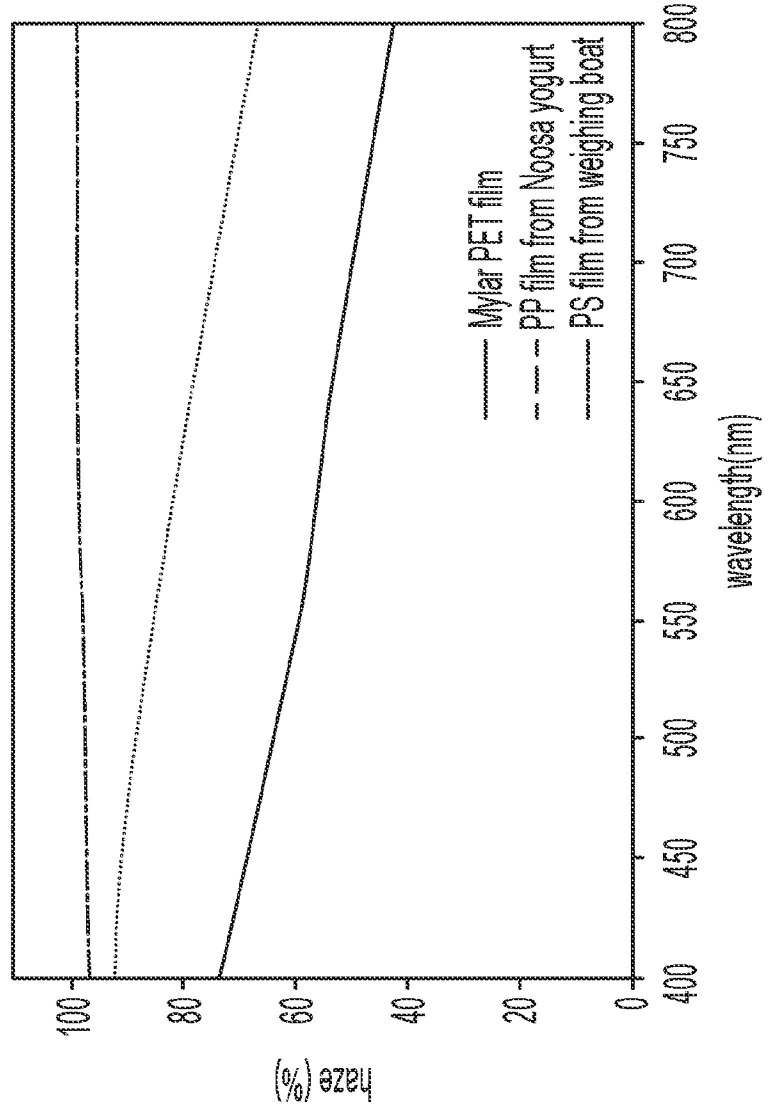
FIG. 13 shows the experimentally measured haze for a mylar PET film, a PP film, and a PS film, according to some embodiments.

FIGS. 12D-12F and show the measured total (solid line) and diffuse (dashed line) transmittance of the three plastic films. All three plastic films have haze greater than 40%. The haze values averaged over all wavelengths are 57% for the PET film (FIG. 12D), 81% for the PP film (FIG. 12E), and 98% for the PS film (FIG. 12F). FIG. 13 shows the measured haze in the PET, PP, and PS films. Since the white background can be seen well through both the PET and PP films, despite having haze between 42% and 82% at wavelengths above 600 nm, these results indicate that average haze values lower than 57% may be unnecessary to achieve the clarity needed for food packaging.

Table 1 lists list the haze and transmittance for all the simulated and measured films to provide a comparison of the clarity of the proposed structures to that of the experimentally measured plastic films. Direct films are PET films with 140 nm anatase particles at 64% volume fraction. Inverse films are PET films with 64% air voids by volume of 225-250 nm. For direct structures (anatase titania in PET), the average haze above 500 nm is smaller than that of the PP film, but the average transmittance from 500 to 780 nm is also lower (20.1% for 18 mil or 44.4% for 2.5 mil). For inverse structures, either films with monodisperse or 20% polydisperse voids have similar transparency to a Mylar PET film, but also block short wavelengths (400 to 500 nm). Such films scatter harmful wavelengths while maintaining high clarity at other wavelengths.

TABLE 1

Comparisons between simulated and measured haze and transmittance.

| | Simulation results | | | | | | | | Experimental measurements | | |
|---|---|---|---|---|---|---|---|---|---|---|---|
| | direct mono-disperse 2.5 mil | direct mono-disperse 18 mil | Inverse mono-disperse 2.5 mil | Inverse mono-disperse 18 mil | Inverse 20% poly-disperse 2.5 mil | Inverse 20% poly-disperse 18 mil | Inverse 100% poly-disperse 2.5 mil | Inverse 100% poly-disperse | Mylar PET film | Noosa PP film | PS film |
| avg haze (500-780 nm) | 22.0% | 74.7% | 13.5% | 42.3% | 32.7% | 74.5% | 99.8% | 100% | 53.6% | 78.6% | 98.2% |
| avg transmittance (400-500 nm) | 44.4% | 20.1% | 16.4% | 8.7% | 26.8% | 6.26% | 10.4% | 9.0% | 79.7% | 78.9% | 28.8% |
| avg transmittance (500-780 nm) | 64.1% | 43.2% | 81.9% | 64% | 65.9% | 38.3% | 15.2% | 7.0% | 82.7% | 81.6% | 38.6% |

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

The invention claimed is:

1. A film comprising a polymer matrix with a first refractive index, a component with a second refractive index embedded in the polymer matrix in a disordered arrangement, wherein the component has a volume fraction greater than 0.3 and the second refractive index is different from the first refractive index, wherein the film scatters 400 to 500 nm wavelengths of light and allows transmission of wavelengths of light from 600 to 800 nm.

2. The film of claim 1, wherein the reflectance from 400 to 500 nm is at least 50%.

3. The film of claim 1, wherein the reflectance from 415 to 455 nm is at least 50%.

4. The film of claim 1, wherein the average reflectance above 500 nm is less than 70%.

5. The film of claim 1, wherein the haze from 400 to 500 nm is at least 90%.

6. The film of claim 1, wherein the haze from 415-455 nm is at least 90%.

7. The film of claim 1, wherein the average haze above 500 nm is less than 80%.

8. The film of claim 1, wherein the polymer matrix is selected from a group consisting of polyethylene terephthalate, polypropylene, low density polyethylene, high density polyethylene, polycarbonate, polylactic acid, polycaprolactone, and combinations thereof.

9. The film of claim 1, wherein the film has a thickness of 0.39-39 mm.

10. The film of claim 1 wherein the polymer matrix is transparent to visible light.

11. The film of claim 1, wherein the polymer matrix has a refractive index of 1.4-1.7.

12. The film of claim 1, wherein the component has a shape selected from a group consisting of spherical, ellipsoidal, rod-like, tetrahedral, octahedral, or polyhedral.

13. The film of claim 1, wherein the component has a diameter of 130-250 nm.

14. The film of claim 1, wherein the film has a first peak of the structure factor with a height between 1 and 10.

15. The film of claim 1, wherein the component has a polydispersity less than 20%.

16. The film of claim 1, wherein the component has a volume fraction of from 0.3-0.64.

17. The film of claim 1, wherein the component has a volume fraction greater than 0.50.

18. The film of claim 1, wherein the component is a void.

19. The film of claim 1, wherein the component is a particle.

20. The film of claim 19, wherein the particle has a refractive index of 1.3-3.0.

21. The film of claim 19, wherein the particle is selected from a group consisting of anatase titania, rutile titania, zinc oxide, alumina, zirconia, silica, polymethylmethacrylate, polystyrene, polybutylmethacrylate, and combinations thereof.

22. The film of claim 19, wherein the second refractive index is greater than the first refractive index.

23. The film of claim 19, wherein the second refractive index is less than the first refractive index.

24. The film of claim 1, further comprising a second polymer layer disposed on one side of the polymer matrix.

25. The film of claim 24, wherein the second polymer layer is selected from a group consisting of polyethylene terephthalate, polypropylene, low density polyethylene, high density polyethylene, polycarbonate, polylactic acid, polycaprolactone, and combinations thereof.

* * * * *